April 4, 1961 M. D. PAPINEAU 2,978,642

SINE WAVE ZERO COMPARATOR

Filed June 30, 1955

INVENTOR.
MILTON D. PAPINEAU
BY

ATTORNEYS

United States Patent Office 2,978,642

Patented Apr. 4, 1961

2,978,642

SINE WAVE ZERO COMPARATOR

Milton D. Papineau, 2303 Cecilia Terrace, San Diego 10, Calif.

Filed June 30, 1955, Ser. No. 519,290

1 Claim. (Cl. 328—20)

(Granted under Title 35, U.S. Code (1952), sec. 266)

The invention described herein may be manufactured and used by or for the Government of the United States of America for governmental purposes without the payment of any royalties thereon or therefor.

This invention relates to sine wave comparators and more particularly to circuitry for developing trigger pulses from sinusoidal waves at the zero cross over points thereof.

For many purposes it is deemed desirable to develop from a sine wave a train of pulses in phase with the sine wave and recurring at an integral multiple of the frequency thereof. For example, such pulse trains may be used in systems for demodulating a frequency modulated wave or for transmitting and comparing the phase relation of a plurality of sinusoidal signals. Examples of such phase comparing systems are particularly described in the co-pending application of Milton D. Papineau for Phase Analyzer, Serial No. 519,289, filed June 30, 1955. Known methods for producing such pulse trains include those which utilize a saturable inductor or harmonic generator and those employing an RC differentiator for peaking a square wave which has been synchronized or otherwise developed from the sine wave input. The peaked outputs of both the saturable inductor and a square wave producing overdriven amplifier combined with a differentiator are greatly affected by amplitude variations which may be present in the input. Consequently additional circuitry is required to obviate such amplitude variations.

The circuitry of the present invention comprises a simple transformer and diode arrangement which provides full wave rectification of the input signal. The rectified signal has the least negative peaks thereof held to a predetermined fixed potential and is fed to the control grid of an amplifier tube having a short grid base whereby only that portion of the rectified signal which has an amplitude close to said fixed potential is amplified and the tube is cut off during the rest of the cycle. If desired a capacitor may be connected across the primary and secondary of the transformer to eliminate alternate peaks of the rectified signal.

It is an object of this invention to provide a simple and improved circuit for developing a train of pulses from a periodic signal.

A further object of this invention is the provision of means for developing from a sinusoidal input wave a train of pulses in phase with the input wave and recurring at a rate equal to or twice the frequency thereof.

Still another object of this invention is the provision of means for developing a pulse train from a sinusoidal wave which is not affected by amplitude variations of the input wave.

A further object of this invention is to provide a train of pulses at zero cross over points of a periodic signal which train follows the frequency of the signal and is independent of the amplitude thereof above a predetermined minimum.

Other objects and many of the attendant advantages of this invention will be readily appreciated as the same becomes better understood by reference to the following detailed description when considered in connection with the accompanying drawings wherein.

In the drawings like numerals refer to like parts.

Figure 1:
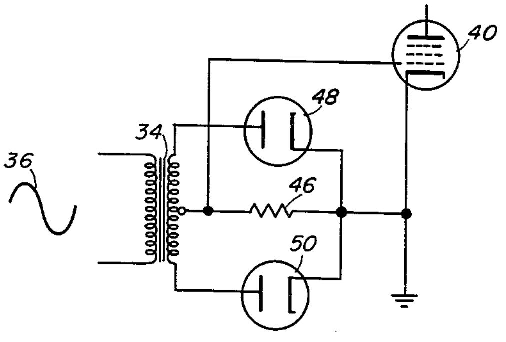
Fig. 1 is a schematic illustration of one form of the sine wave comparator of the present invention.
Figure 2:
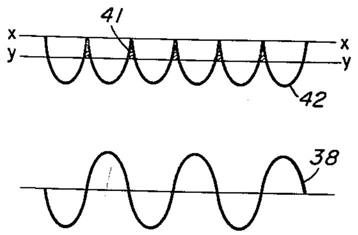
Fig. 2 is a synchrograph of waveforms developed in the circuit of Fig. 1.

As illustrated in Figs. 1 and 2 a periodic sinusoidal input signal 36 fed to the primary of transformer 34 produces a corresponding signal 38 in the transformer secondary. Signal 38 is full wave rectified by diodes 48, 50 and appears on the grid of vacuum tube 40 as voltage wave 42. The latter varies in only one direction from the potential of the cathode connected end of resistor 46.

This trigger amplifier or pulse generator is basically a full wave rectifier comprising the diodes 48, 50 which have their plates connected to opposite ends of the transformer secondary and their cathodes connected to each other and to a point of fixed potential, *x—x*, Fig. 2, such as the ground connection illustrated. Across the resistor 46 which is connected between the diode cathodes and a center tap of the transformer secondary, appears the rectified signal 42 which is fed to the control grid of amplifier tube 40. The cathode of tube 40 is directly connected to the aforementioned point of fixed potential *x—x* (which may be ground) and the tube is chosen for and operated with a short grid base whereby any grid to cathode voltage greater than a predetermined magnitude such as *y—y* (below the level of *y—y*) cuts off the tube. With such an arrangement the output of tube 40 will be unaffected by voltage levels below *y—y* and the tube will pass and amplify only the shaded peaks 41. The duration of peaks 41 may be shortened and their amplitude increased by further amplification and clipping. The pulse train output of tube 40 will be independent of the amplitude envelope (above a value which cuts the tube off) of the input signal and will exactly follow the frequency thereof.

It will be noted that the peaks or trigger pulses 41 occur at the points of zero cross over and only at these points. Because of the short grid base of tube 40 the system has no upper limit as to amplitude of input signal voltage consistent with the parts used. The lower limit depends only upon the minimum voltage required to overcome the minimum or conductive resistance of the diodes and upon the grid base of tube 40. With the three cathodes and one end of resistor 46 grounded as shown the rectified signal developed is always negative with respect to ground. It will readily be appreciated that the ground potential to which the cathodes are held may be replaced by any other suitable level of fixed potential whereby the level *x—x* of Fig. 2 would then be such level of fixed potential with the signal 42 varying from and at all times below such level. The points of the rectified signal or least negative peaks 41 are always at the potential *x—x* and can occur only when both ends of the transformer secondary are at equal levels of potential. These times of equal (zero) potential occur only at the times corresponding to the times at which the instantaneous magnitude of the input signal is equal to the average D.-C. potential thereof.

The circuit of Fig. 1 produces an output at the plate of tube 40 which comprises a train of trigger pulses which recur at twice the frequency of signal 36 and which occur at the times of change of polarity of signal 38 (the zero cross over points of signal 36).

Figure 3:
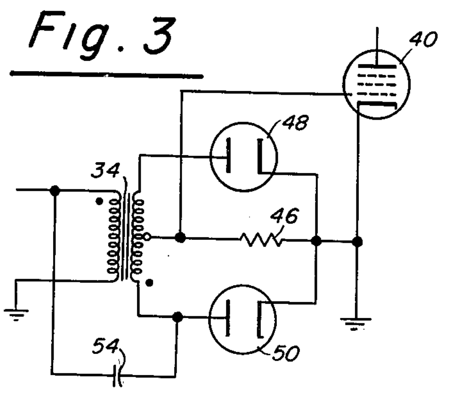
Fig. 3 is a schematic illustration of a modification of the comparator of Fig. 1.

For having the repetition rate of the pulse train produced by the circuit of Fig. 1 and eliminating alternate peaks thereof the circuit may be modified as shown in Fig. 3. All of the elements and relation of elements of Fig. 3 are identical with those indicated by like numerals in Fig. 1 but there has been added a capacitor 54 which is coupled between one end of the transformer primary and one end of the transformer secondary.

Figure 4:
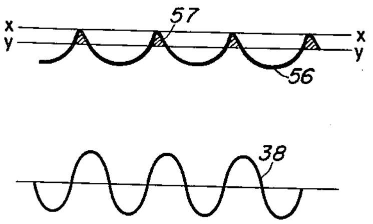
Fig. 4 is a synchrograph of waveforms developed in the circuit of Fig. 3.

As illustrated in Fig. 3 capacitor 54 is connected between terminals of respective transformer windings which are of like polarity at any one time, such terminals of like polarity being indicated in Fig. 3 by the dots adjacent thereto. As indicated in Fig. 4 the effect of the capacitor is to maintain the voltage 56 across resistor 46 well below the level *x—x* (which may be ground as shown) during periods of negative slope of the signal 38. Waveform 56, the grid to cathode voltage of tube 40, therefore has the least negative peaks 57 occurring only at times closely adjacent alternate ones of the zero cross over points of the input signal whereby the output of the amplifier tube 40 will comprise a train of pulses occurring substantially at zero cross over points of signal 38 and recurring at the frequency thereof.

As in the circuit of Fig. 1 the peaks or pulses 57 will have a maximum amplitude at fixed potential level *x—x* and all portions of signal 56 below a level *y—y* as determined by the grid base of tube 40 will be eliminated. As explained above the duration of the pulses at the plate of tube 40 may be shortened and their amplitude increased if deemed necessary.

Obviously many modifications and variations of the present invention are possible in the light of the above teachings. It is therefore to be understood that within the scope of the appended claim the invention may be practiced otherwise than as specifically described.

What is claimed is:

A circuit for producing trigger pulses at the points of zero cross over of a periodic signal voltage comprising a full wave rectifier including a transformer having a center tapped secondary and a pair of diodes having the cathodes thereof connected together and the plates thereof respectively connected to opposite ends of said secondary, a resistor interconnecting said cathodes and the center tap of the secondary, an amplifier tube having the cathode thereof grounded and connected directly to said cathodes of the diodes and having the control grid thereof connected directly to said center tap, said amplifier tube of the sharp cutoff type whereby the tube is cut off except during short intervals at said cross over points and only portions of the rectified signal within a few volts of zero are amplified to provide trigger pulses and a capacitor electrically interconnected between the primary and secondary windings of said transformer to respective terminals thereof of like polarity for reducing the repetition rate of said trigger pulses to one per cycle of the periodic voltage and provide a short time constant path across the source potential for charging said capacitor, and a long time constant discharge path for said capacitor comprising the primary winding, half the secondary winding and a resistor in series, to ground.

References Cited in the file of this patent

UNITED STATES PATENTS

| | | |
|---|---|---|
| 2,195,853 | Fitch | Apr. 2, 1940 |
| 2,195,855 | Fitch | Apr. 2, 1940 |
| 2,598,491 | Bergfors | May 27, 1952 |